United States Patent
Hermans et al.

(10) Patent No.: US 10,501,322 B2
(45) Date of Patent: Dec. 10, 2019

(54) MIXED OXYGEN AND ORGANIC COMPOUND TREATMENT FOR FUNCTIONALIZING OXYGEN ONTO THE SURFACE OF BORON NITRIDE

(71) Applicant: Wisconsin Alumni Research Foundation, Madison, WI (US)

(72) Inventors: Ive Hermans, Madison, WI (US); Joseph Thomas Grant, Madison, WI (US); Juan Mauricio Venegas, Madison, WI (US); Samuel Peter Burt, Madison, WI (US); Philipp Mueller, Madison, WI (US); Somphonh Peter Phivilay, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 17 days.

(21) Appl. No.: 15/843,305

(22) Filed: Dec. 15, 2017

(65) Prior Publication Data
US 2018/0170755 A1 Jun. 21, 2018

Related U.S. Application Data

(60) Provisional application No. 62/436,067, filed on Dec. 19, 2016.

(51) Int. Cl.
*C01B 21/064* (2006.01)

(52) U.S. Cl.
CPC .............. *C01B 21/0648* (2013.01)

(58) Field of Classification Search
None
See application file for complete search history.

(56) References Cited

U.S. PATENT DOCUMENTS

2017/0066700 A1* 3/2017 Hermans ............. B01J 35/1019

FOREIGN PATENT DOCUMENTS

WO WO-2014130687 A1 * 8/2014 ......... C01B 21/0648

OTHER PUBLICATIONS

Grant, J. T. et al, "Selective oxidative dehydrogenation of proapane to propene using boron nitride catalysts," Science, vol. 354, No. 6319, Dec. 23, 2016 (published online Dec. 1, 2016), pp. 1570-1573.
Grant, J. T. et al, "Supplementary Materials for Selective oxidative dehydrogenation of proapane to propene using boron nitride catalysts," Science, vol. 354, No. 6319, Dec. 23, 2016 (published online Dec. 1, 2016), pp. 1-25.

* cited by examiner

*Primary Examiner* — Guinever S Gregorio
(74) *Attorney, Agent, or Firm* — Boyle Fredrickson S.C.

(57) ABSTRACT

Improved methods of synthesizing oxygen-functionalized boron nitride (O—BN) are disclosed. In the disclosed methods, boron nitride (BN) in any form is contacted with a gaseous composition or compositions that include oxygen and an organic compound, such as, but not limited to, a hydrocarbon.

21 Claims, 9 Drawing Sheets
(9 of 9 Drawing Sheet(s) Filed in Color)

MIXED OXYGEN AND ORGANIC COMPOUND TREATMENT FOR FUNCTIONALIZING OXYGEN ONTO THE SURFACE OF BORON NITRIDE

CROSS REFERENCE TO RELATED APPLICATIONS

This application claims the benefit of U.S. provisional Application No. 62/436,067, filed on Dec. 19, 2016, which is incorporated by reference herein in its entirety.

STATEMENT REGARDING FEDERALLY SPONSORED RESEARCH OR DEVELOPMENT

N/A

FIELD OF THE INVENTION

The disclosure relates to methods of functionalizing the surface of boron nitride with oxygen to produce oxygen-functionalized BN (O—BN).

BACKGROUND OF THE INVENTION

Boron nitride (BN) in all of its forms, including without limitation hexagonal BN (h-BN), BN nanosheets (BNNSs) and BN nanotubes (BNNTs), can be surface-functionalized with oxygen-containing functional groups, such as hydroxyls (—OH) or ethers (—OR), as well as with other functional groups, such as amino (—$NH_3$), amine (—NHR), acyl (—COR), alkyl (—R) or halides (—X) moieties. For a comprehensive review of representative methods used to functionalize BN and potential applications of functionalized BN, see, e.g., Weng et al., *Chem. Soc. Rev.*, 45, 3989-4012 (2016).

A number of specific applications have been reported for oxygen-functionalized BN (O—BN). As non-limiting examples, O—BN may be used as a catalyst for the oxidative dehydrogenation of propane to propene (Grant et al., *Science*, 1 Dec. 2016, DOI: 10.1126/science.aaf7885), as a non-toxic carrier for the delivery of anticancer drugs (Weng et al., *ACS Nano*, 8, 6123-6130 (2014)), as a thermal conducting filler in N-isopropyl-acrylamide hydrogels (Xiao et al., *Advanced Materials*, 27, 7196-7203 (2015)), as a hydrogen storage agent (Lei et al., *Nano Energy*, 6, 219-224 (2014)), and as a water cleaning agent (Lei et al., *Nature Communications*, 4, 1777, DOI: 10.1038/ncomms2818 (2013)).

A number of methods are known in the art for synthesizing O—BNs. For example, Weng et al. (*ACS Nano*, 8, 6123-6130 (2014)) disclose synthesizing hydroxylated boron nitride ((BN(OH)$_x$ (x=0.6-0.9)) by dry mixing carbon nitride (g-$C_3N_4$) and boric acid. Notably, this method is a "pre" BN synthesis that does not use BN as a starting material.

As a second example, Liao et al. (*Scientific Reports*, 5, 14510, DOI:10.1038/srep14510 (2015)) disclose the oxidative etching of h-BN by dry mixing h-BN with silver acetate to produce Ag—BN, which is then etched with nitric acid. Notably, this method requires difficult separations and very high temperature conditions.

As a third example, Xiao et al. (*Advanced Materials*, 27, 7196-7203 (2015)) disclose a method of exfoliating and hydroxylating h-BN using a high temperature steam treatment.

Other methods known in the art for synthesizing O—BN include ball-milling BN with sodium hydroxide, and exposing BN to nitric acid.

Each of the known methods of synthesizing O—BN has one or more significant disadvantages, such as requiring numerous and/or complicated separation steps (e.g., vacuum filtration, washing), requiring difficult to manage reaction conditions, such as very high temperatures, requiring costly specialty equipment (e.g., ball-milling equipment, reflux condensers, filtration equipment), and/or exhibiting unacceptably low O—BN yields. Furthermore, the known methods do not exhibit the high yield recovery and scalability that are needed to support large-scale commercial production of O—BN.

Accordingly, there is a need for new and improved methods of producing O—BN that are less costly, exhibit higher yield O—BN recovery, and are more scalable than previously known methods.

BRIEF SUMMARY

We disclose herein new and improved methods for synthesizing oxygen-functionalized BN (O—BN). Specifically, we have surprisingly determined that O—BN can be synthesized by exposing BN to a mixture of gases that includes an organic compound and oxygen. The disclosed methods are much less complex than previously known methods, do not require any separation steps, and can be performed at relatively low temperatures. Thus, the disclosed methods are much more scalable than previously known methods for synthesizing O—BN.

Accordingly, in a first aspect, the disclosure encompasses a method for making oxygen-functionalized boron nitride (O—BN) from boron nitride (BN). The method includes the step of contacting boron nitride with one or more compositions that together comprise both oxygen and one or more organic compounds. As a result of performing this step, the boron nitride becomes oxygen-functionalized.

In some embodiments, the one or more compositions are gaseous. In some such embodiments, the boron nitride is contacted with the one or more gaseous compositions by a continuous flow of the one or more gaseous compositions over the surface of the boron nitride.

In some embodiments where the one or more compositions are gaseous, the one or more gaseous compositions include a gaseous composition that includes both the oxygen and the one or more organic compounds.

In some embodiments where the one or more compositions are gaseous, the one or more gaseous compositions may further include nitrogen.

In some embodiments, the boron nitride is in the form of hexagonal boron nitride (h-BN), boron nitride nanomeshes (h-BN nanomeshes), boron nitride nanosheets (BNNSs), boron nitride nanoribbons (BNNRs) or boron nitride nanotubes (BNNTs).

In some embodiments, the one or more organic compounds include three or more carbon atoms (i.e., are $C_{3+}$ organic compounds), four or more carbon atoms (i.e., are $C_{4+}$ organic compounds), five or more carbon atoms (i.e., are $C_{5+}$ organic compounds), six or more carbon atoms (i.e., are $C_{6+}$ organic compounds), seven or more carbon atoms (i.e., are $C_{7+}$ organic compounds), or eight or more carbon atoms (i.e., are $C_{8+}$ organic compounds). In some embodiments, the one or more organic compounds have from four to ten carbon atoms. In some such embodiments, the one or more organic compounds are aliphatic hydrocarbons or alcohols having from four to ten carbon atoms.

In some embodiments, the one or more organic compounds may include an aliphatic hydrocarbon, an aromatic hydrocarbon, an alcohol, a ketone, an aldehyde, a carboxylic acid, a carbonate, a boronic acid, or a borinic acid.

In some embodiments, the one or more organic compounds have from one to ten carbon atoms. In some such embodiments, the one or more organic compounds may include an aliphatic hydrocarbon or an alcohol having from one to ten carbon atoms. In some such embodiments, the aliphatic hydrocarbon is an alkane, an alkene, or an alkyne.

In some embodiments, the one or more organic compounds are alkanes. In some such embodiments, the alkane is a $C_1$-$C_{10}$ alkane. In some such embodiments, the alkane is a $C_{4+}$ alkane. In some such embodiments, the alkane is a $C_4$-$C_{10}$ alkane.

In some embodiments where the one or more organic compounds are alkanes, the alkane is a straight chain (n) alkane or a branched alkane.

In some embodiments where the one or more organic compounds are alkanes, the alkane may be methane, ethane, propane, isobutene, or n-butane. In some such embodiments, the alkane is isobutene or n-butane.

In some embodiments, the one or more organic compounds have more than three carbon atoms.

In some embodiments, the one or more organic compounds do not include propane.

In some embodiments, the boron nitride is contacted with the one or more compositions for a total of 2-200 hours. In some such embodiments, the boron nitride is contacted with the one or more compositions for a total of 2-6 hours, 6-12 hours, 12-72 hours, 72-124 hours, or 124-200 hours. In some such embodiments, the boron nitride is contacted with the one or more compositions for a total of 2-4 hours, 4-6 hours, 6-8 hours, 8-10 hours, 10-12 hours, 12-14 hours, 14-16 hours, 16-18 hours, 18-20 hours, 20-22 hours, 22-24 hours, 24-26 hours, 26-28 hours, 28-30 hours, 30-32 hours, 32-36 hours, 36-40 hours, 40-44 hours, 44-48 hours, 48-52 hours, 52-60 hours, 60-68 hours, 68-76 hours, 76-84 hours, 84-100 hours, 100-116 hours, 116-140 hours, 140-170 hours, or 170-200 hours.

In some embodiments, the boron nitride is contacted with the one or more compositions at a temperature of 200° C.-900° C. In some such embodiments, the boron nitride is contacted with the one or more compositions at a temperature of 250° C.-850° C., 300° C.-800° C., 400° C.-700° C., or 450° C.-550° C. In other such embodiments, the boron nitride is contacted with the one or more compositions at a temperature of less than 500° C. In some embodiments, the boron nitride is contacted with the one or more compositions at a temperature of 200° C.-500° C., 225° C.-500° C., 250° C.-500° C., or 350° C.-500° C.

In some embodiments, the one or more compositions are gaseous, and the one or more organic compounds in the one or more compositions have a concentration ($P_{organic\ compound}$ or Mol %$_{organic\ compound}$) of 0.05-0.95 atm or Mol %. In some such embodiments, the one or more organic compounds in the one or more compositions have a concentration of 0.05-0.90 atm or Mol %, 0.05-0.85 atm or Mol %, 0.10-0.80 atm or Mol %, 0.10-0.75 atm or Mol %, 0.10-0.70 atm or Mol %, 0.10-0.65 atm or Mol %, 0.10-0.60 atm or Mol %, 0.10-0.50 atm or Mol %, 0.10-0.45 atm or Mol %, 0.10-0.40 atm or Mol %, 0.10-0.35 atm or Mol %, or 0.10-0.30 atm or Mol %.

In some embodiments, the one or more compositions are gaseous, and the oxygen in the one or more compositions has a concentration ($P_{O2}$ or Mol %$_{O2}$) of 0.05-0.95 atm or Mol %. In some such embodiments, the oxygen in the one or more compositions has a concentration of 0.05-0.90 atm or Mol %, 0.05-0.85 atm or Mol %, 0.05-0.80 atm or Mol %, 0.05-0.75 atm or Mol %, 0.05-0.70 atm or Mol %, 0.05-0.65 atm or Mol %, 0.05-0.60 atm or Mol %, 0.05-0.50 atm or Mol %, 0.05-0.45 atm or Mol %, 0.05-0.40 atm or Mol %, 0.05-0.35 atm or Mol %, 0.05-0.30 atm or Mol %, or 0.10-0.30 atm or Mol %.

In some embodiments, the one or more compositions are gaseous, and the boron nitride is contacted with the one or more gaseous compositions by a continuous flow of the one or more gaseous compositions over the surface of the boron nitride. In some such embodiments, the total flow rate of the one or more gaseous compositions over the surface of the boron nitride is 10-1000 mL/min. In some such embodiments, the total flow rate of the one or more gaseous compositions over the surface of the boron nitride is 10-900 mL/min, 10-800 mL/min, 10-700 mL/min, 10-600 mL/min, 10-500 mL/min, 15-500 mL/min, 15-400 mL/min, 20-400 mL/min., 30-400 mL/min, 30-200 mL/min, 30-150 mL/min, 30-120 mL/min, or 30-100 mL/min. In other such embodiments, the total flow rate of the one or more gaseous compositions over the surface of the boron nitride is less than 80 mL/min. In some embodiments, the total flow rate of the one or more gaseous compositions over the surface of the boron nitride is 60 mL/min or higher, 70 mL/min or higher, or 80 mL/min or higher.

In some embodiments, the method further includes the step of removing water from the O—BN surface or from the environment adjacent to the O—BN surface.

In a second aspect, the disclosure encompasses a composition that includes oxygen-functionalized boron nitride (O—BN), and an additional feature to prevent potential decomposition that may be facilitated by the presence of water. In some embodiments, the composition is substantially free of water. In some embodiments, the composition further includes a desiccant.

In some embodiments, the O—BN is in the form of hexagonal oxygen-functionalized boron nitride (O-h-BN), oxygen-functionalized boron nitride nanomeshes (O-h-BN nanomeshes), oxygen-functionalized boron nitride nanosheets (O—BNNSs), oxygen-functionalized boron nitride nanoribbons (O—BNNRs) or oxygen-functionalized boron nitride nanotubes (O—BNNTs).

Further objects, features and advantages of the invention will be apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be better understood and features, aspects and advantages other than those set forth above will become apparent when consideration is given to the following detailed description thereof. Such detailed description makes reference to the following drawings.

Examples 1 and 2; T for Example 2 was 470° C. or 500° C. rather than 490° C.), the BN became oxygen-functionalized (O—BN).

Figure 2A:
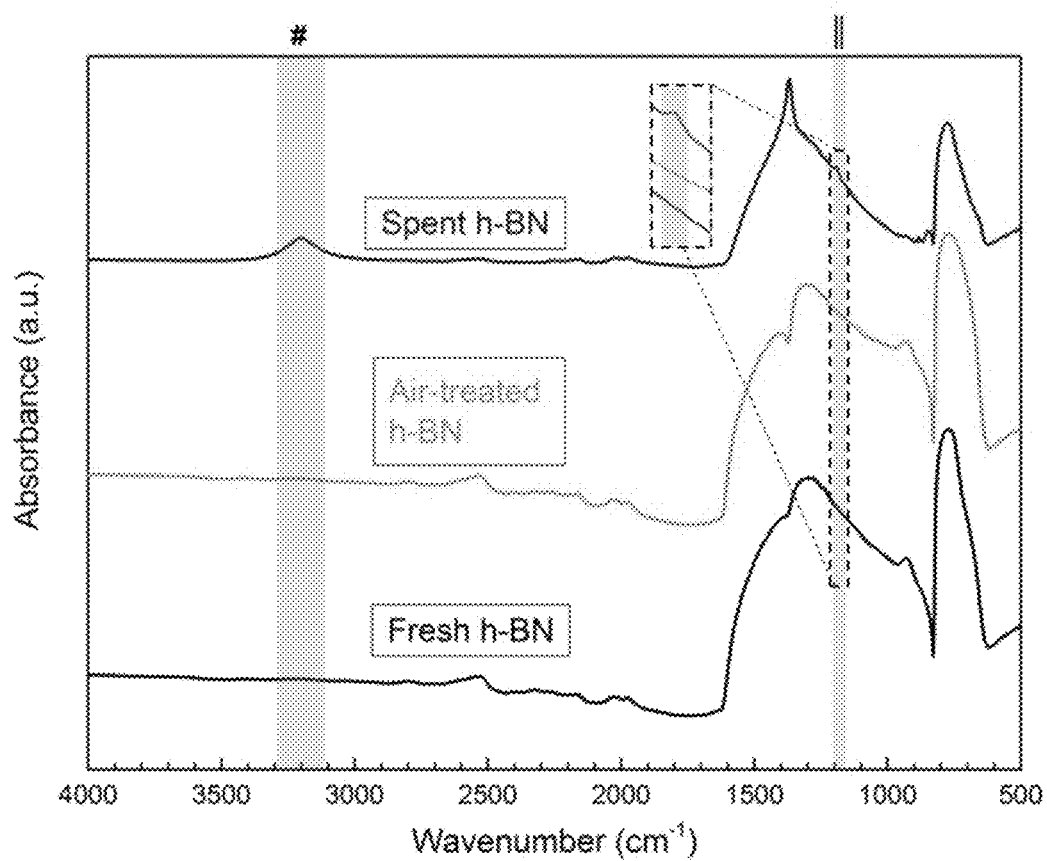

FIG. 2A is a graph showing Attenuated Total Reflectance (ATR) Fourier Transform Infrared (FTIR) spectroscopic measurement of Fresh (untreated), Air-treated, and Air and Propane treated (spent) h-BN. The highlighted broad feature at ~3200 cm$^{-1}$ (#) and the sharp signal at 1190 cm$^{-1}$ (||) revealed in spent h-BN are assigned to OH-stretching and B—O stretching vibrations, respectively. The inset figure highlights the feature at 1190 cm$^{-1}$.

Figure 2B:
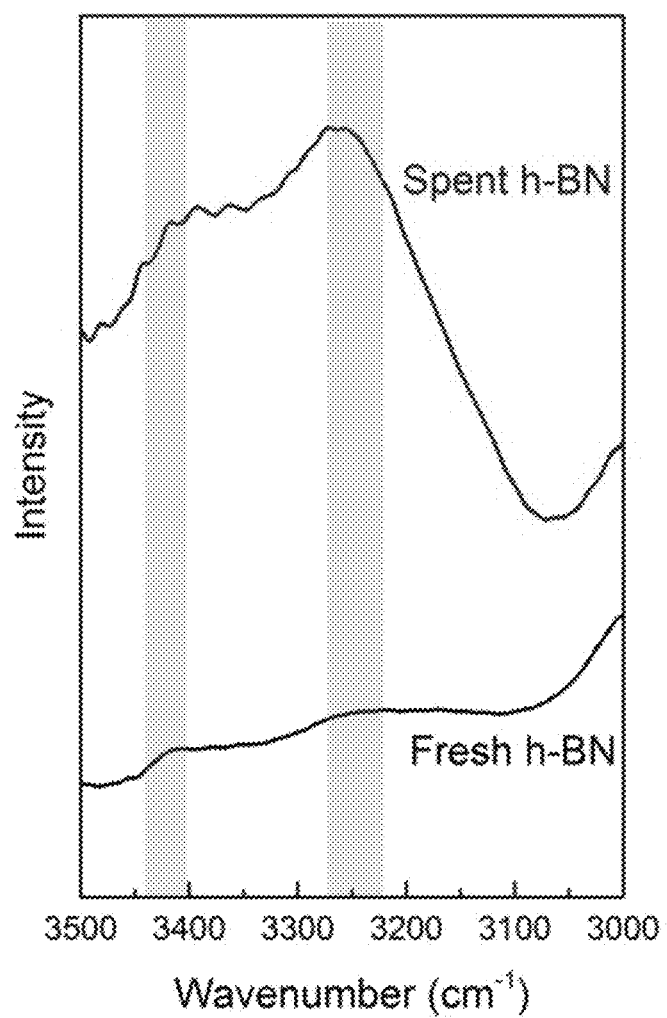

FIG. 2B is a graph showing Diffuse Reflectance Infrared Fourier Transform Spectroscopy (DRIFTS) measurement of Fresh (black line) and Spent hexagonal boron nitride (h-BN) (blue line). The green shading highlights the emergence of vibrations at ~3420 and 3250 cm$^{-1}$ (assigned to single and concerted OH-stretching, respectively) for spent h-BN. DRIFTS measurement was performed under flowing air at 480° C.

Figure 3A:
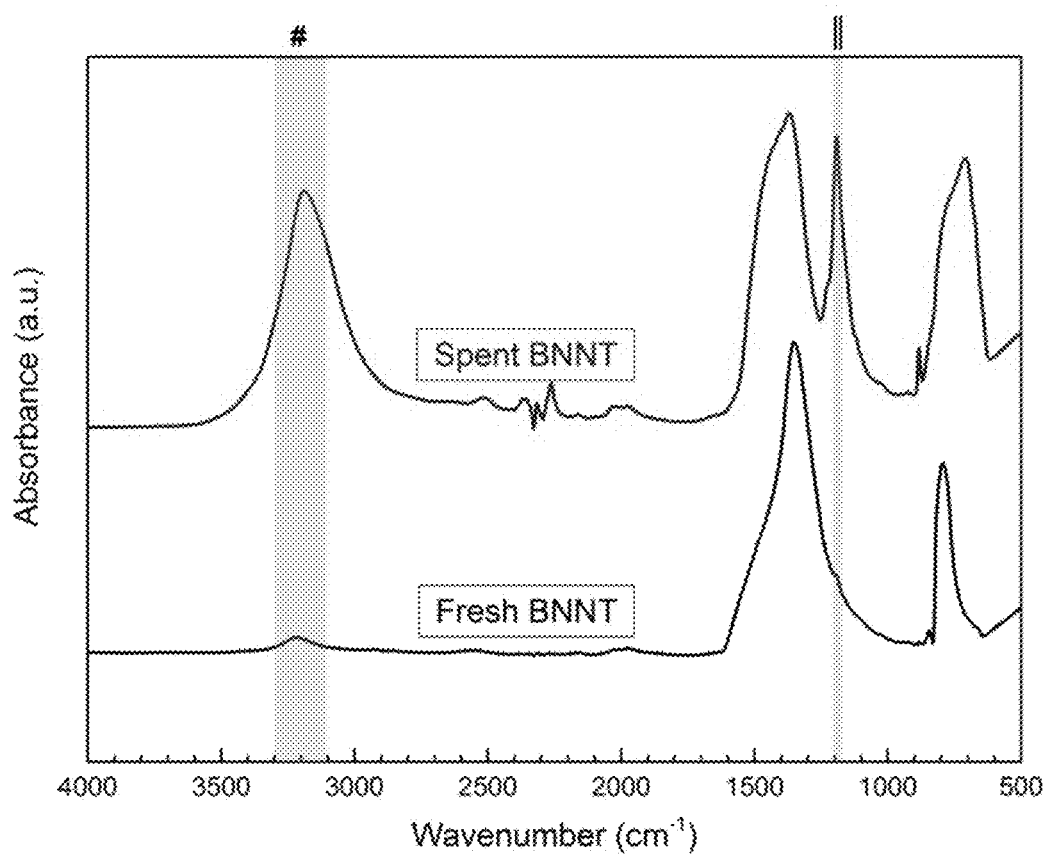

FIG. 3A is a graph showing Attenuated Total Reflectance (ATR) Fourier Transform Infrared spectroscopic measurement of Fresh and Spent boron nitride nanotube (BNNT). The highlighted broad feature at ~3200 cm$^{-1}$ (#) and the sharp signal at 1190 cm$^{-1}$ (||) which increase intensity in spent BNNT are assigned to OH-stretching and B—O stretching vibrations, respectively.

Figure 3B:
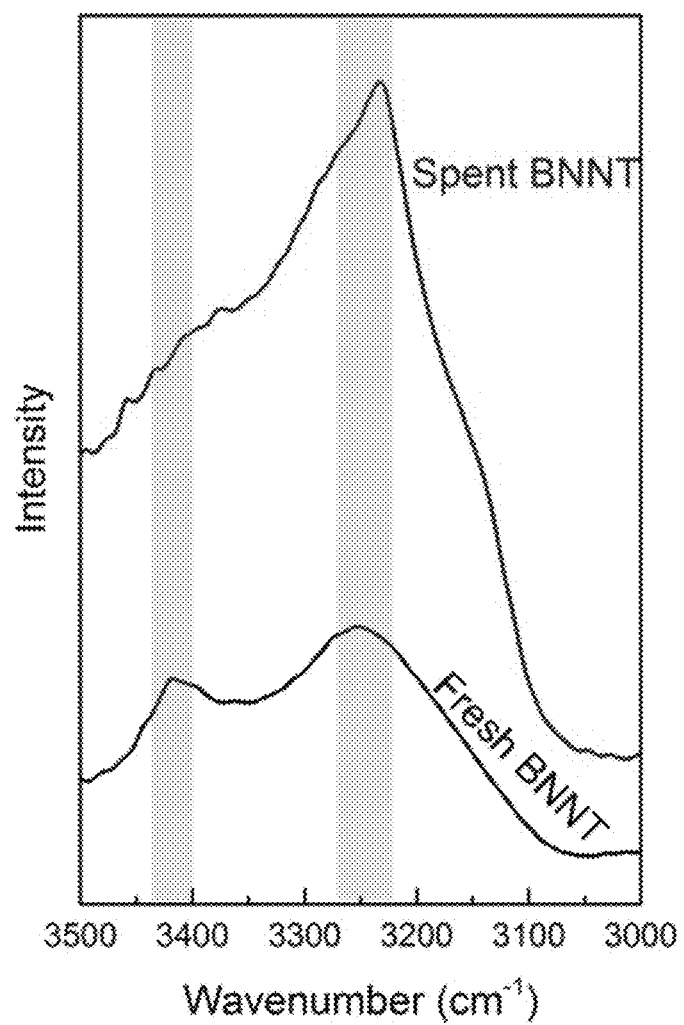

FIG. 3B is a graph showing Diffuse Reflectance Infrared Fourier Transform Spectroscopy (DRIFTS) measurement of Fresh (black line) and Spent BNNT (blue line). The green shading highlights the increase in the intensity of the vibrations at ~3420 and 3250 cm$^{-1}$ (assigned to single and concerted OH-stretching, respectively) for spent BNNT. DRIFTS measurement was performed under flowing air at 480° C.

Figure 4:
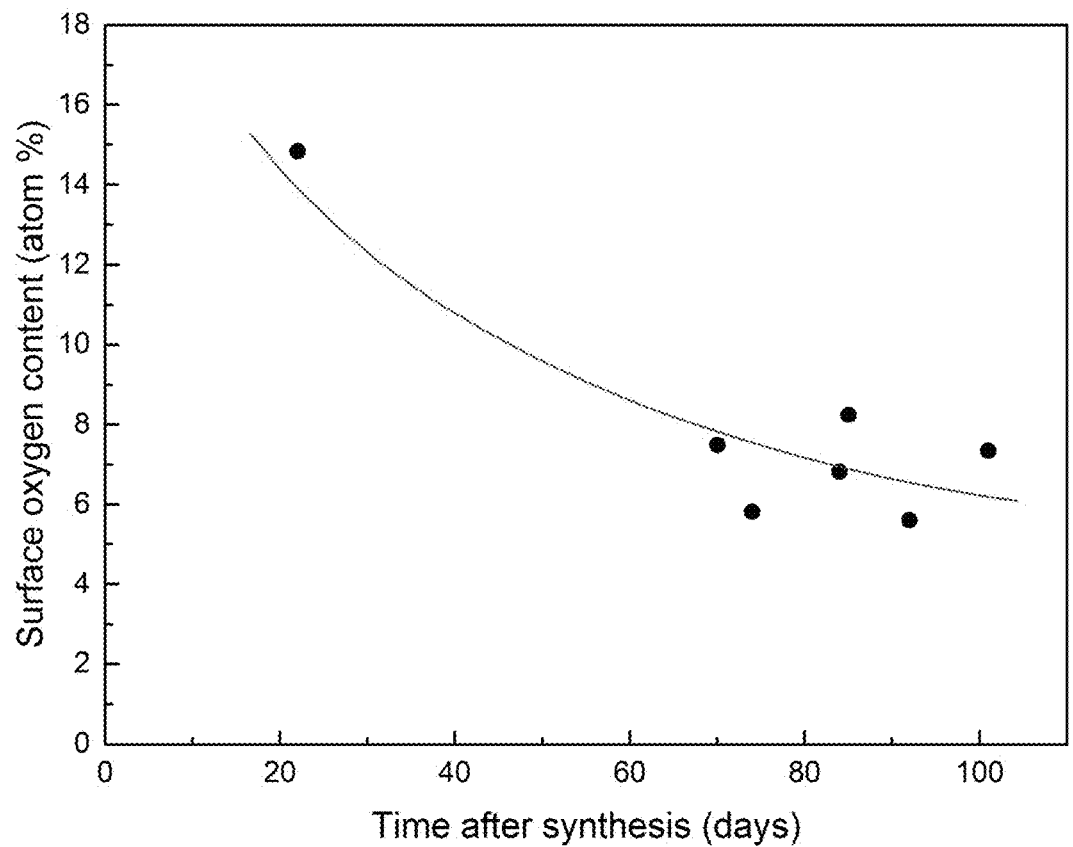

FIG. 4 is a graph showing surface oxygen content (atom %) as a function of time after synthesis for oxygen-functionalized hexagonal boron nitride (h-BN), as measured by X-ray Photoelectron Spectroscopy (XPS). The oxygen-functionalized h-BN appears to lose oxygen atoms after initial synthesis.

Figure 5:
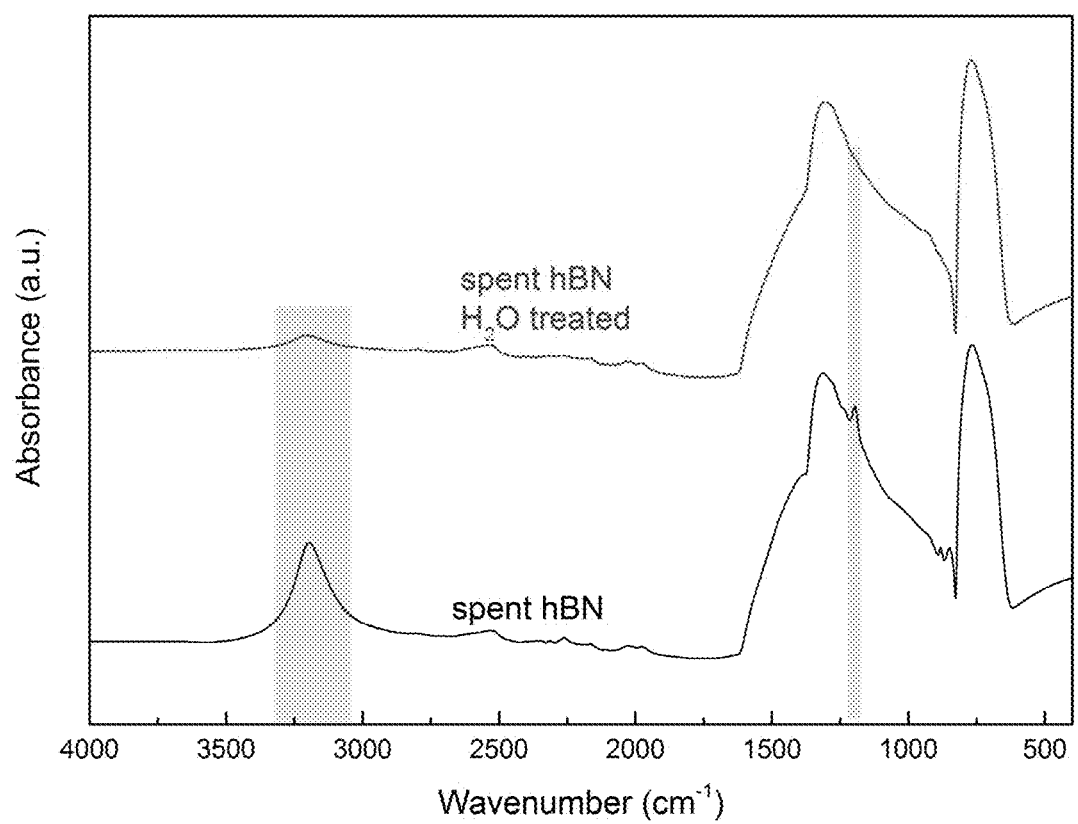

FIG. 5 is a graph showing Attenuated Total Reflectance (ATR) Fourier Transform Infrared spectroscopic measurement of Air and Propane treated (spent) h-BN (bottom line), and Air and Propane treated (spent) h-BN that is subsequently treated with water (top line). The highlighted broad feature at ~3200 cm$^{-1}$ and the sharp signal at 1190 cm$^{-1}$ revealed in spent h-BN are assigned to OH-stretching and B—O stretching vibrations, respectively. Note that both of these features are lost in the spent sample that is subsequently treated with water, indicating that atmospheric moisture may be responsible for the loss of surface oxygen over time for that is observed in oxygen-functionalized h-BN.

Figure 6:
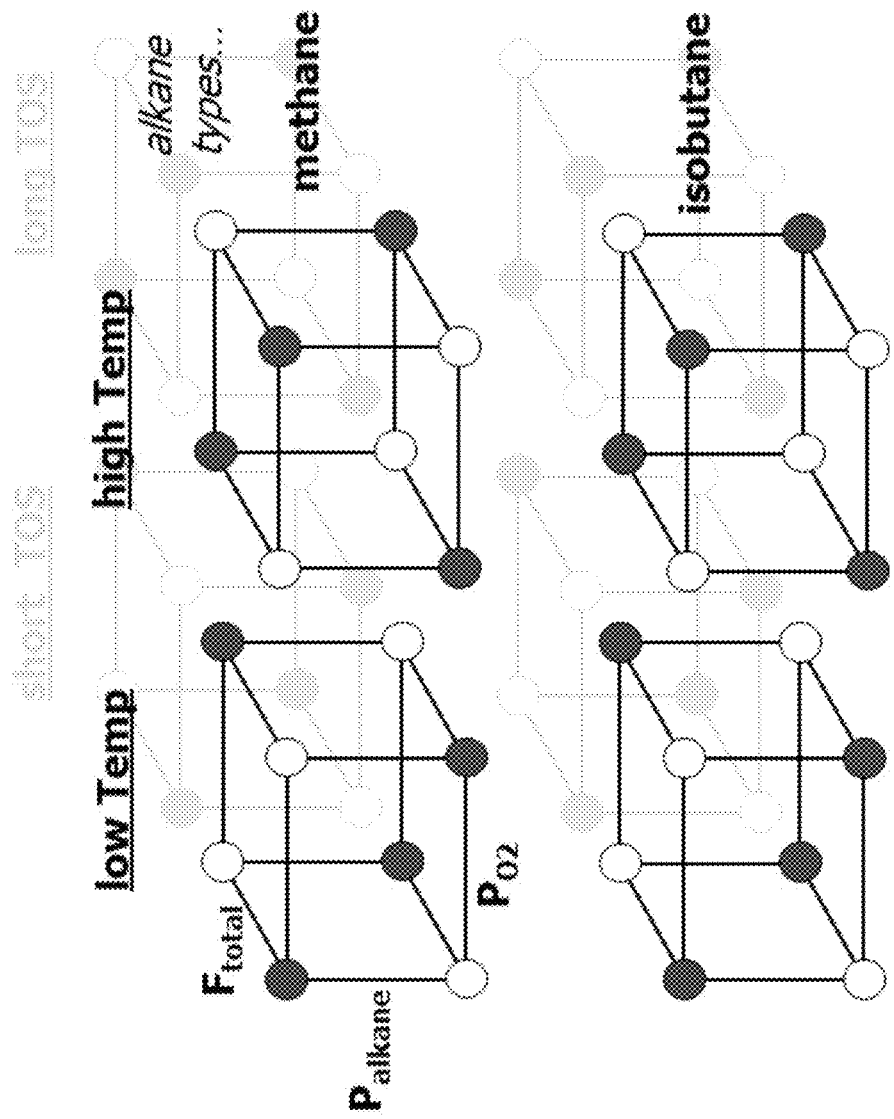

FIG. 6 is a visual representation of the completed fractional factorial described in more detail in Example 4 below. Each of the vertices represents a trial, with a fractional factorial being the completion of each of the red (or each of the white) points.

Figure 7:
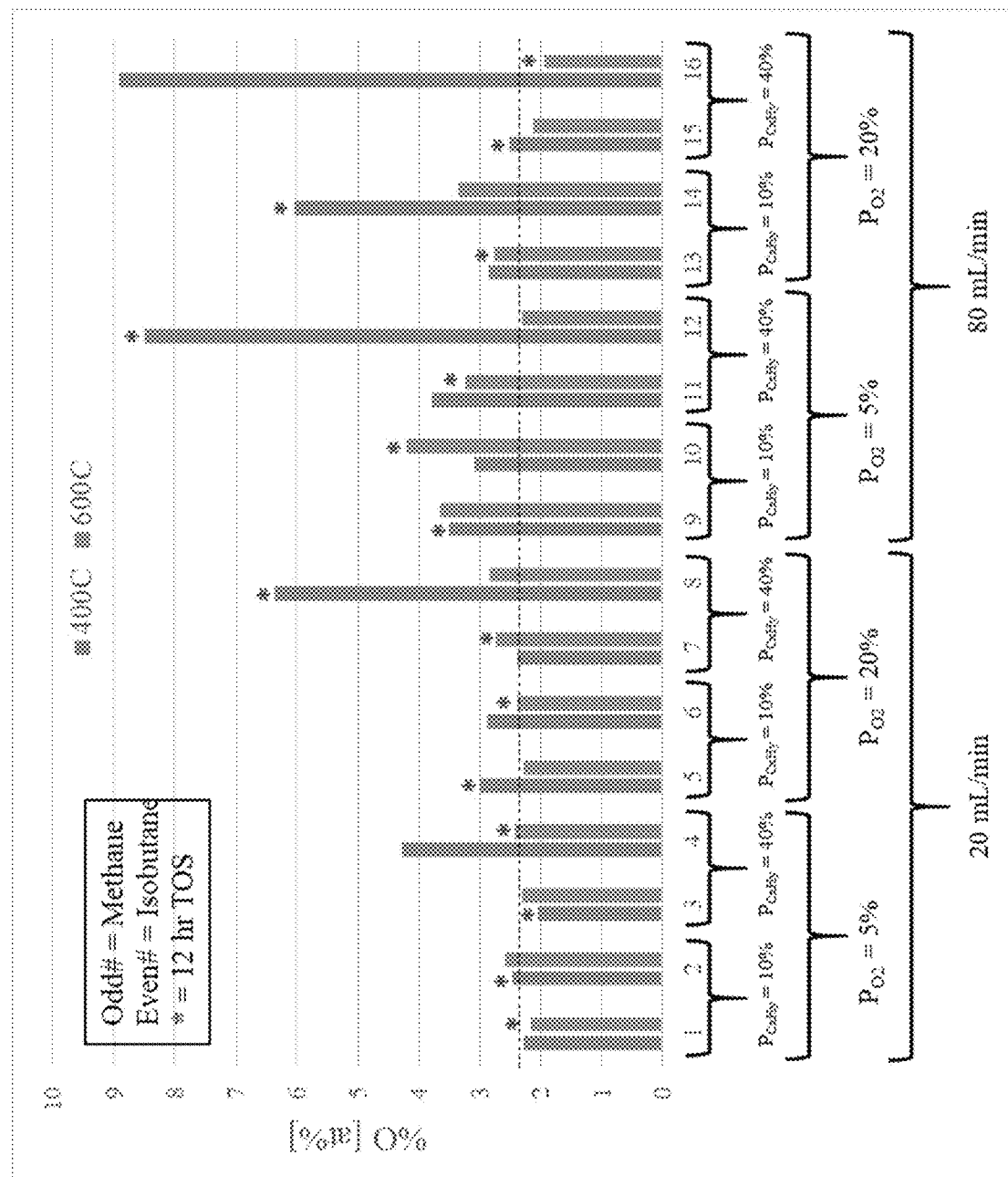

FIG. 7 is a bar graph illustrating the degree of oxygen functionalization of h-BN (expressed as the percentage of atoms of the h-BN surface identified as oxygen) for each trial described in Example 4 below, evaluated by X-ray Photoelectron Spectroscopy (XPS). The nominal O-content of fresh h-BN (2.3 at %) is represented in this graph as a dotted black line. Trials are grouped with brackets, colors, stars (*), or number assignments according to the level of the factor assigned to the trial. These results were inputted into statistical analysis to determine which factors had the greatest (and least) influence on the degree of O-functionalization of the h-BN surface. The trials which produced the greatest O-functionalization used a longer-chain alkane, lower treatment temperature, faster gas flowrate, and a higher concentration of the alkane.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

I. In General

Before the present materials and methods are described, it is understood that this invention is not limited to the particular methodology, protocols, materials, and reagents described, as these may vary. It is also to be understood that the terminology used in this disclosure is for the purpose of describing particular embodiments only, and is not intended to limit the scope of the present invention, which will be limited only by the language of the appended claims.

As used in this disclosure and in the appended claims, the singular forms "a", "an", and "the" include plural reference unless the context clearly dictates otherwise. The terms "a" (or "an"), "one or more" and "at least one" can be used interchangeably. The terms "comprising", "including", and "having" can also be used interchangeably.

Unless defined otherwise, all technical and scientific terms used in this disclosure, including element symbols, have the same meanings as commonly understood by one of ordinary skill in the art. Chemical compound names that are commonly used and recognized in the art are used interchangeably with the equivalent IUPAC name. For example, ethene is the same as ethylene, propene is the same as propylene, butene is the same as butylene, 2-methylpropane is the same as isobutane, and 2-methylpropene is the same as isobutene.

The following abbreviations are used throughout this disclosure: ATR, Attenuated Total Reflectance; BN, boron nitride in any of its forms; BN nanomesh(es), boron nitride nanomesh(es); BNNS(s), boron nitride nanosheet(s); BNNR(s), boron nitride nanoribbon(s); BNNT(s), boron nitride nanotube(s); DRIFTS, Diffuse Reflectance Infrared Fourier Transform Spectroscopy; h-BN, hexagonal form of boron nitride; O—BN, oxygen-functionalized boron nitride; P, partial pressure for a given gas; XPS, X-ray photoelectron spectroscopy.

All publications and patents specifically mentioned in this disclosure are incorporated by reference for all purposes, including for describing and disclosing the chemicals, instruments, statistical analysis and methodologies that are reported in the publications that might be used in connection with the disclosed methods and devices. All references cited in this disclosure are to be taken as indicative of the level of skill in the art.

II. The Invention

This disclosure is based on our discovery that when exposed to an organic compound and oxygen, boron nitride becomes oxygen-functionalized.

Oxygen-functionalized Boron Nitride (O—BN)

By "oxygen-functionalized" boron nitride (O—BN), we mean any form of boron nitride having one or more oxygen atoms covalently bonded to its surface. Oxygen-functionalization can occur anywhere on the BN surface. In non-limiting examples, oxygen-functionalization occurs at the BN's armchair edge sites or at the BN's zig-zag edge sites. However, oxygen functionalization is not limited to such sites.

Although oxygen-functionalized BN is most commonly functionalized with one or more hydroxyl (—OH) moieties, oxygen-functionalized BN is not limited to hydroxylated BN. Other moieties may be functionalized onto the BN surface, as long as the moieties include an oxygen atom that is covalently bonded directly to a boron or nitrogen atom on the BN surface. As non-limiting examples, oxygen-functional BN may include on its surface the peroxide-like moiety —O—O— or the nitroxyl radical NO.

Exemplary Forms of Boron Nitride

The boron nitride used in the disclosed method can be made from any available form of boron nitride, including, without limitation, amorphous boron nitride (a-BN), hexagonal boron nitride (h-BN), cubic boron nitride (c-BN), wurtzite boron nitride (w-BN), boron nitride-containing composites, boron nitride nanotubes (BNNTs), boron nitride nanosheets (BNNSs), boron nitride nanoribbons (BNNRs) and boron nitride nanomeshes.

h-BN, a stable crystal form of BN, has a layered structure similar to graphite. Within each layer, boron and nitrogen atoms are bound by strong covalent bonds, whereas the layers are held together by weak van der Waals forces.

Boron nitride nanotube(s) (BNNT(s)) are cylindrical structures formed from "rolled up" sheets of alternating and covalently bonded nitrogen and boron atoms. Typical BNNTs have a diameter of several to hundreds of nanometers and a length of many micrometers. They are structurally similar to carbon nanotubes, which are made up of "rolled up" graphitic carbon sheets.

Boron nitride nanomesh(es) are two-dimensional boron nitride nanostructures consisting of a single layer of alternating and covalently bonded boron and nitrogen atoms, which self-assemble to form a highly regular mesh. The structure of BN nanomeshes is similar to the structure of graphene, in that they form an assembly of hexagonal pores. In a non-limiting example, the distance between two pore centers is 3.2 nm and the pore diameter is ~2 nm, and the pores are about 0.05 nm deep. Other terms used in the literature for this form of boron nitride include h-BN monolayers, boronitrene, white graphene, boron nitride nanosheets, boron nitride nanoribbons, and boron nitride nanoplatelets.

For more information regarding BNNTs and BN nanosheets, see, e.g., Golberg, et al., *ACS Nano*, 4, 2979-2993 (2010).

Exemplary Organic Compounds

A wide variety of organic compounds can be used in combination with oxygen to oxygen-functionalize BN. The non-limiting examples below demonstrate that the method works using a number of different alkanes, including methane, ethane, propane, isobutane, and n-butane.

Accordingly, the method is not limited to specific organic compounds. Classes of organic compounds that could be used in the method include, without limitation, aliphatic hydrocarbons, including alkanes (e.g., methane, ethane, propane, butane, isobutane, etc.), alkenes (e.g., ethylene, propylene, butylene, etc.), and alkynes (e.g., acetylene, propyne, etc.), aromatic hydrocarbons (e.g., benzene, toluene, etc.), alcohols (e.g., methanol, ethanol, propanol, etc.), ketones (e.g., acetone, methyl ethyl ketone (MEK), etc.), aldehydes (e.g., formaldehyde, acetaldehyde, etc.), carboxylic acids (e.g., acetic acid, propionic acid, etc.), carbonates (e.g., dimethyl carbonate, ethyl methyl carbonate, etc.), boronic acids (e.g., phenylboronic acid, methylboronic acid, etc.), or borinic acids (e.g., diphenylborinic acid, dimethylborinic acid, etc.).

As demonstrated in the examples below, the identity of the organic compound used in the method can influence the extent of oxygen functionalization in the final O—BN product. Thus, the specific organic compound used can be selected to optimize the desired properties of the final product. As a non-limiting example, the data in Example 2 show that the extent of oxygen-functionalization is directly correlated with the number of carbon atoms in the organic compound, with the two $C_{4+}$ compounds exhibiting the highest extent of oxygen functionalization.

Consistent with this, the data in Example 4 show that the extent of oxygen-functionalization is significantly influenced by the nature of the organic compound used, with alkanes containing a weaker C—H bond (e.g., the tertiary C—H of isobutane) resulting in a greater extent of oxygen-functionalization than alkanes containing a stronger C—H bonds (e.g., the primary C—H of methane). The extent of the oxygen-functionalization atop BN is then generally dependent on the strength of the weakest C—H bond of the organic compound. Accordingly, in certain embodiments, the organic compound used is a $C_{3+}$, $C_{4+}$, $C_{5+}$, $C_{6+}$, $C_{7+}$ or $C_{8+}$ alkane, a corresponding alkene/alkyne/aromatic, or a corresponding oxygenate compound (alcohols, aldehydes, ketones, carboxylic acids, carbonates).

Other Parameters for Optimizing the Desired Properties of the O—BN

In addition to the selection of the specific organic compound used, other parameters may be tuned to optimize the desired properties of the final product, including, without limitation, the concentration of the organic compound used, the concentration of the oxygen used, the total flow rate of the reactant composition, the temperature of treatment, the time of treatment, moisture content, and the presence or absence of water.

A. Organic Compound Concentration ($P_{organic\ compound}$; V $\%_{organic\ compound}$; or Mol $\%_{organic\ compound}$)

The concentration of the organic compound can be tuned to optimize the properties of the resulting product. In some embodiments, the one or more organic compounds in the one or more compositions used in the method have a concentration ($P_{organic\ compound}$; V $\%_{organic\ compound}$; or Mol $\%_{organic\ compound}$) of 0.05-0.95 atm; 0.05-0.95 V %; or 0.05-0.95 Mol %. Concentration of the organic compound may be expressed as partial pressure (P) in atmospheres under conditions where the total pressure of the reactant gas mixture is about one atmosphere. At one atmosphere and at any other total pressure, concentration may alternatively be expressed as V % or Mol %.

In some embodiments, the concentration of the organic compound is about 0.05 atm, V % or Mol %; about 0.06 atm, V % or Mol %; about 0.07 atm, V % or Mol %; about 0.08 atm, V % or Mol %; about 0.09 atm, V % or Mol %; about 0.10 atm, V % or Mol %; about 0.11 atm, V % or Mol %; about 0.12 atm, V % or Mol %; about 0.13 atm, V % or Mol %; about 0.14 atm, V % or Mol %; about 0.15 atm, V % or Mol %; about 0.16 atm, V % or Mol %; about 0.17 atm, V % or Mol %; about 0.18 atm, V % or Mol %; about 0.19 atm, V % or Mol %; about 0.20 atm, V % or Mol %; about 0.21 atm, V % or Mol %; about 0.22 atm, V % or Mol %; about 0.23 atm, V % or Mol %; about 0.24 atm, V % or Mol %; about 0.25 atm, V % or Mol %; about 0.26 atm, V % or Mol %; about 0.27 atm, V % or Mol %; about 0.28 atm, V % or Mol %; about 0.29 atm, V % or Mol %; about 0.30 atm, V % or Mol %; about 0.31 atm, V % or Mol %; about 0.32 atm, V % or Mol %; about 0.33 atm, V % or Mol %; about 0.34 atm, V % or Mol %; about 0.35 atm, V % or Mol %; about 0.36 atm, V % or Mol %; about 0.37 atm, V % or Mol %; about 0.38 atm, V % or Mol %; about 0.39 atm, V % or Mol %; about 0.40 atm, V % or Mol %; about 0.41 atm, V % or Mol %; about 0.42 atm, V % or Mol %; about 0.43 atm, V % or Mol %; about 0.44 atm, V % or Mol %; about 0.45 atm, V % or Mol %; about 0.46 atm, V % or Mol %; about 0.47 atm, V % or Mol %; about 0.48 atm, V % or Mol %; about 0.49 atm, V % or Mol %; about 0.50 atm, V % or Mol %; about 0.51 atm, V % or Mol %; about 0.52 atm, V % or Mol %; about 0.53 atm, V % or Mol %; about 0.54 atm, V % or Mol %; about 0.55 atm, V % or Mol %; about 0.56 atm, V % or Mol %; about 0.57 atm, V % or Mol %; about 0.58 atm, V % or Mol %; about 0.59 atm, V % or Mol %; about 0.60 atm, V % or Mol %; about 0.61 atm, V % or Mol %; about 0.62 atm, V % or Mol %; about 0.63 atm, V % or Mol %; about 0.64 atm, V % or Mol %; about 0.65 atm, V % or Mol %; about 0.66 atm, about 0.67 atm, about 0.68 atm, about 0.69 atm, about 0.70 atm, about 0.71 atm, about 0.72 atm, V % or Mol %; about 0.73 atm, V % or Mol %; about 0.74 atm, V % or Mol %; about 0.75 atm, V % or Mol %; about 0.76 atm, V % or Mol %; about 0.77 atm, V % or Mol %; about 0.78 atm, V % or Mol %; about 0.79 atm, V % or Mol %; about 0.80 atm, V % or Mol %; about 0.81 atm, V % or Mol %; about 0.82 atm, V % or Mol %; about 0.83 atm, V % or Mol %; about 0.84 atm, V % or Mol %; about 0.85 atm, V % or Mol %; about 0.86 atm, V % or Mol %; about 0.87 atm, V % or Mol %; about 0.88 atm, V % or Mol %; about 0.89 atm, V % or Mol %; about 0.90 atm, V % or Mol %; about 0.91 atm, V % or Mol %; about 0.92 atm, V % or Mol %; about 0.93 atm, V % or Mol %; about 0.94 atm, V % or Mol %; or about 0.95 atm, V % or Mol %.

In some embodiments, the concentration of the one or more organic compounds is within one of the possible ranges defined by (a) the possible minimum concentrations of 0.05 atm, V % or Mol %; 0.10 atm, V % or Mol %; 0.15 atm, V % or Mol %; 0.20 atm, V % or Mol %; 0.25 atm, V % or Mol %; 0.30 atm, V % or Mol %; 0.35 atm, V % or Mol %; 0.40 atm, V % or Mol %; 0.45 atm, V % or Mol %; 0.50 atm, V % or Mol %; 0.55 atm, V % or Mol %; 0.60 atm, V % or Mol %; 0.65 atm, V % or Mol %; 0.70 atm, V % or Mol %; 0.75 atm, V % or Mol %; 0.80 atm, V % or Mol %; 0.85 atm, V % or Mol %; or 0.90 atm, V % or Mol %; and (b) the possible maximum concentrations of 0.10 atm, V % or Mol %; 0.15 atm, V % or Mol %; 0.20 atm, V % or Mol %; 0.25 atm, V % or Mol %; 0.30 atm, V % or Mol %; 0.35 atm, V % or Mol %; 0.40 atm, V % or Mol %; 0.45 atm, V % or Mol %; 0.50 atm, V % or Mol %; 0.55 atm, V % or Mol %; 0.60 atm, V % or Mol %; 0.65 atm, V % or Mol %; 0.70 atm, V % or Mol %; 0.75 atm, V % or Mol %; 0.80 atm, V % or Mol %; 0.85 atm, V % or Mol %; 0.90 atm, V % or Mol %; or 0.95 atm, V % or Mol %.

B. Oxygen Concentration ($P_{O2}$)

The concentration of the oxygen can be tuned to optimize the properties of the resulting product. In some embodiments, the oxygen in the one or more compositions used in the method have a concentration ($P_{O2}$; V $\%_{O2}$ or Mol $\%_{O2}$) of 0.05-0.95 atm; 0.05-0.95 V %; or 0.05-0.95 Mol %. Concentration of the oxygen may be expressed as partial pressure (P) in atmospheres under conditions where the total pressure of the reactant gas mixture is about one atmosphere. At one atmosphere and at any other total pressure, concentration may alternatively be expressed as V % or Mol %.

In some embodiments, the concentration of the oxygen is about 0.05 atm, V % or Mol %; about 0.06 atm, V % or Mol %; about 0.07 atm, V % or Mol %; about 0.08 atm, V % or Mol %; about 0.09 atm, V % or Mol %; about 0.10 atm, V % or Mol %; about 0.11 atm, V % or Mol %; about 0.12 atm, V % or Mol %; about 0.13 atm, V % or Mol %; about 0.14 atm, V % or Mol %; about 0.15 atm, V % or Mol %; about 0.16 atm, V % or Mol %; about 0.17 atm, V % or Mol %; about 0.18 atm, V % or Mol %; about 0.19 atm, V % or Mol %; about 0.20 atm, V % or Mol %; about 0.21 atm, V % or Mol %; about 0.22 atm, V % or Mol %; about 0.23 atm, V % or Mol %; about 0.24 atm, V % or Mol %; about 0.25 atm, V % or Mol %; about 0.26 atm, V % or Mol %; about 0.27 atm, V % or Mol %; about 0.28 atm, V % or Mol %; about 0.29 atm, V % or Mol %; about 0.30 atm, V % or Mol %; about 0.31 atm, V % or Mol %; about 0.32 atm, V % or Mol %; about 0.33 atm, V % or Mol %; about 0.34 atm, V % or Mol %; about 0.35 atm, V % or Mol %; about 0.36 atm, V % or Mol %; about 0.37 atm, V % or Mol %; about 0.38 atm, V % or Mol %; about 0.39 atm, V % or Mol %; about 0.40 atm, V % or Mol %; about 0.41 atm, V % or Mol %; about 0.42 atm, V % or Mol %; about 0.43 atm, V % or Mol %; about 0.44 atm, V % or Mol %; about 0.45 atm, V % or Mol %; about 0.46 atm, V % or Mol %; about 0.47 atm, V % or Mol %; about 0.48 atm, V % or Mol %; about 0.49 atm, V % or Mol %; about 0.50 atm, V % or Mol %; about 0.51 atm, V % or Mol %; about 0.52 atm, V % or Mol %; about 0.53 atm, V % or Mol %; about 0.54 atm, V % or Mol %; about 0.55 atm, about 0.56 atm, V % or Mol %; about 0.57 atm, V % or Mol %; about 0.58 atm, V % or Mol %; about 0.59 atm, V % or Mol %; about 0.60 atm, V % or Mol %; about 0.61 atm, V % or Mol %; about 0.62 atm, V % or Mol %; about 0.63 atm, V % or Mol %; about 0.64 atm, V % or Mol %; about 0.65 atm, V % or Mol %; about 0.66 atm, V % or Mol %; about 0.67 atm, V % or Mol %; about 0.68 atm, V % or Mol %; about 0.69 atm, V % or Mol %; about 0.70 atm, V % or Mol %; about 0.71 atm, V % or Mol %; about 0.72 atm, V % or Mol %; about 0.73 atm, V % or Mol %; about 0.74 atm, V % or Mol %; about 0.75 atm, V % or Mol %; about 0.76 atm, V % or Mol %; about 0.77 atm, V % or Mol %; about 0.78 atm, V % or Mol %; about 0.79 atm, V % or Mol %; about 0.80 atm, V % or Mol %; about 0.81 atm, V % or Mol %; about 0.82 atm, V % or Mol %; about 0.83 atm, V % or Mol %; about 0.84 atm, V % or Mol %; about 0.85 atm, V % or Mol %; about 0.86 atm, V % or Mol %; about 0.87 atm, V % or Mol %; about 0.88 atm, V % or Mol %; about 0.89 atm, V % or Mol %; about 0.90 atm, V % or Mol %; about 0.91 atm, V % or Mol %; about 0.92 atm, V % or Mol %; about 0.93 atm, V % or Mol %; about 0.94 atm, V % or Mol %; or about 0.95 atm, V % or Mol %.

In some embodiments, the concentration of the oxygen is within one of the possible ranges defined by (a) the possible minimum concentrations of 0.05 atm, V % or Mol %; 0.10 atm, V % or Mol %; 0.15 atm, V % or Mol %; 0.20 atm, V % or Mol %; 0.25 atm, V % or Mol %; 0.30 atm, V % or Mol %; 0.35 atm, V % or Mol %; 0.40 atm, V % or Mol %; 0.45 atm, V % or Mol %; 0.50 atm, V % or Mol %; 0.55 atm, V % or Mol %; 0.60 atm, V % or Mol %; 0.65 atm, V % or Mol %; 0.70 atm, V % or Mol %; 0.75 atm, V % or Mol %; 0.80 atm, V % or Mol %; 0.85 atm, V % or Mol %; or 0.90 atm, V % or Mol %; and (b) the possible maximum concentrations of 0.10 atm, V % or Mol %; 0.15 atm, V % or Mol %; 0.20 atm, V % or Mol %; 0.25 atm, V % or Mol %; 0.30 atm, V % or Mol %; 0.35 atm, V % or Mol %; 0.40 atm, V % or Mol %; 0.45 atm, V % or Mol %; 0.50 atm, V % or Mol %;

0.55 atm, V % or Mol %; 0.60 atm, V % or Mol %; 0.65 atm, V % or Mol %; 0.70 atm, V % or Mol %; 0.75 atm, V % or Mol %; 0.80 atm, V % or Mol %; 0.85 atm, V % or Mol %; 0.90 atm, V % or Mol %; or 0.95 atm, V % or Mol %.

C. Total Flow Rate ($F_{total}$)

In some embodiments, the one or more compositions are gaseous, and the boron nitride is contacted with the one or more gaseous compositions by a continuous flow of the one or more gaseous compositions over the surface of the boron nitride. The total flow rate can be tuned to optimize the properties of the resulting product. In some such embodiments, the total flow rate of the one or more gaseous compositions over the surface of the boron nitride is 10-1000 mL/min.

In some embodiments, the total flow rate is within one of the possible ranges defined by (a) the possible minimum flow rates of 10 mL/min, 20 mL/min, 30 mL/min, 40 mL/min, 50 mL/min. 60 mL/min, 70 mL/min, 80 mL/min, 90 mL/min, 100 mL/min, 110 mL/min, 120 mL/min, 130 mL/min, 140 mL/min, 150 mL/min. 160 mL/min, 170 mL/min, 180 mL/min, 190 mL/min, 200 mL/min, 210 mL/min, 220 mL/min, 230 mL/min, 240 mL/min, 250 mL/min. 260 mL/min, 270 mL/min, 280 mL/min, 290 mL/min, 300 mL/min, 310 mL/min, 320 mL/min, 330 mL/min, 340 mL/min, 350 mL/min. 360 mL/min, 370 mL/min, 380 mL/min, 390 mL/min, 400 mL/min, 410 mL/min, 420 mL/min, 430 mL/min, 440 mL/min, 450 mL/min. 460 mL/min, 470 mL/min, 480 mL/min, 490 mL/min, 500 mL/min, 510 mL/min, 520 mL/min, 530 mL/min, 540 mL/min, 550 mL/min. 560 mL/min, 570 mL/min, 580 mL/min, 590 mL/min, 600 mL/min, 610 mL/min, 620 mL/min, 630 mL/min, 640 mL/min, 650 mL/min. 660 mL/min, 670 mL/min, 680 mL/min, 690 mL/min, 700 mL/min, 710 mL/min, 720 mL/min, 730 mL/min, 740 mL/min, 750 mL/min. 760 mL/min, 770 mL/min, 780 mL/min, 790 mL/min, 800 mL/min, 810 mL/min, 820 mL/min, 830 mL/min, 840 mL/min, 850 mL/min. 860 mL/min, 870 mL/min, 880 mL/min, 890 mL/min, 900 mL/min, 910 mL/min, 920 mL/min, 930 mL/min, 940 mL/min, 950 mL/min. 960 mL/min, 970 mL/min, 980 mL/min, or 990 mL/min; and (b) the possible maximum flow rates of 20 mL/min, 30 mL/min, 40 mL/min, 50 mL/min. 60 mL/min, 70 mL/min, 80 mL/min, 90 mL/min, 100 mL/min, 110 mL/min, 120 mL/min, 130 mL/min, 140 mL/min, 150 mL/min. 160 mL/min, 170 mL/min, 180 mL/min, 190 mL/min, 200 mL/min, 210 mL/min, 220 mL/min, 230 mL/min, 240 mL/min, 250 mL/min. 260 mL/min, 270 mL/min, 280 mL/min, 290 mL/min, 300 mL/min, 310 mL/min, 320 mL/min, 330 mL/min, 340 mL/min, 350 mL/min. 360 mL/min, 370 mL/min, 380 mL/min, 390 mL/min, 400 mL/min, 410 mL/min, 420 mL/min, 430 mL/min, 440 mL/min, 450 mL/min. 460 mL/min, 470 mL/min, 480 mL/min, 490 mL/min, 500 mL/min, 510 mL/min, 520 mL/min, 530 mL/min, 540 mL/min, 550 mL/min. 560 mL/min, 570 mL/min, 580 mL/min, 590 mL/min, 600 mL/min, 610 mL/min, 620 mL/min, 630 mL/min, 640 mL/min, 650 mL/min. 660 mL/min, 670 mL/min, 680 mL/min, 690 mL/min, 700 mL/min, 710 mL/min, 720 mL/min, 730 mL/min, 740 mL/min, 750 mL/min. 760 mL/min, 770 mL/min, 780 mL/min, 790 mL/min, 800 mL/min, 810 mL/min, 820 mL/min, 830 mL/min, 840 mL/min, 850 mL/min. 860 mL/min, 870 mL/min, 880 mL/min, 890 mL/min, 900 mL/min, 910 mL/min, 920 mL/min, 930 mL/min, 940 mL/min, 950 mL/min. 960 mL/min, 970 mL/min, 980 mL/min, or 990 mL/min, or 1000 mL/min.

We have determined that within these ranges, a comparatively higher flow rate (e.g., 80 mL/min versus 20 mL/min) results in increased oxygen functionalization. Accordingly, in some embodiments, the flow rate is 60 mL/min or higher; 70 mL/min or higher; or 80 mL/min or higher.

D. Treatment Temperature

The temperature at which the BN is contacted with the organic compound and the oxygen can be tuned to optimize the properties of the resulting product. In some embodiments, the treatment occurs at a temperature of 200° C.-900° C.

In some embodiments, the temperature of treatment is within one of the possible ranges defined by (a) the possible minimum temperatures of 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C., 400° C., 410° C., 420° C., 430° C., 440° C., 450° C., 460° C., 470° C., 480° C., 490° C., 500° C., 510° C., 520° C., 530° C., 540° C., 550° C., 560° C., 570° C., 580° C., 590° C., 600° C., 610° C., 620° C., 630° C., 640° C., 650° C., 660° C., 670° C., 680° C., or 690° C.; and (b) the possible maximum temperatures of 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C., 400° C., 410° C., 420° C., 430° C., 440° C., 450° C., 460° C., 470° C., 480° C., 490° C., 500° C., 510° C., 520° C., 530° C., 540° C., 550° C., 560° C., 570° C., 580° C., 590° C., 600° C., 610° C., 620° C., 630° C., 640° C., 650° C., 660° C., 670° C., 680° C., 690° C., 700° C., 710° C., 720° C., 730° C., 740° C., 750° C., 760° C., 770° C., 780° C., 790° C., 800° C., 810° C., 820° C., 830° C., 840° C., 850° C., 860° C., 870° C., 880° C., 890° C., or 900° C.

We have determined that within these ranges, a comparatively lower temperature (e.g., 400° C. versus 600° C.) results in increased Oxygen functionalization. Accordingly, in some embodiments, the reaction temperature is 200° C. to 500° C.; 225° C. to 500° C.; 250° C. to 500° C.; or 300° C. to 500° C.

E. Treatment Time

The total time that the BN is contacted with the organic compound and the oxygen can be tuned to optimize the properties of the resulting product. In some embodiments, the total treatment time is from 2 to 200 hours.

In some embodiments, the total treatment time is within one of the possible ranges defined by (a) the possible minimum treatment times of 2 hours, 3 hours, 4, hours, 5 hours, 6 hours, 7 hours, 8 hours, 9 hours, 10 hours, 11 hours, 12 hours, 13 hours, 14, hours, 15 hours, 16 hours, 17 hours, 18 hours, 19 hours, 20 hours, 21 hours, 22 hours, 23 hours, 24, hours, 25 hours, 26 hours, 27 hours, 28 hours, 29 hours, 30 hours, 31 hours, 32 hours, 33 hours, 34, hours, 35 hours, 36 hours, 37 hours, 38 hours, 39 hours, 40 hours, 41 hours, 42 hours, 43 hours, 44, hours, 45 hours, 46 hours, 47 hours, 48 hours, 49 hours, 50 hours, 51 hours, 52 hours, 53 hours, 54, hours, 55 hours, 56 hours, 57 hours, 58 hours, 59 hours, 60 hours, 61 hours, 62 hours, 63 hours, 64, hours, 65 hours, 66 hours, 67 hours, 68 hours, 69 hours, 70 hours, 71 hours, 72 hours, 73 hours, 74, hours, 75 hours, 76 hours, 77 hours, 78 hours, 79 hours, 80 hours, 81 hours, 82 hours, 83 hours, 84, hours, 85 hours, 86 hours, 87 hours, 88 hours, 89 hours, 90 hours, 91 hours, 92 hours, 93 hours, 94, hours, 95 hours, 96 hours, 97 hours, 98 hours, 99 hours, 100 hours, 101 hours, 102 hours, 103 hours, 104, hours, 105 hours, 106 hours, 107 hours, 108 hours, 109 hours, 110 hours, 111 hours, 112 hours, 113 hours, 114, hours, 115 hours, 116 hours, 117 hours, 118 hours, 119 hours, 120 hours, 121 hours, 122 hours, 123 hours, 124, hours, 125 hours, 126 hours, 127 hours, 128 hours, 129 hours, 130 hours, 131 hours, 132 hours, 133 hours, 134, hours, 135 hours, 136 hours, 137 hours, 138 hours, 139 hours, 140 hours, 141 hours, 142 hours, 143 hours, 144, hours, 145 hours, 146 hours, 147 hours, 148 hours, 149 hours, 150 hours, 151 hours, 152 hours, 153 hours, 154, hours, 155 hours, 156 hours, 157 hours, 158 hours, 159 hours, 160 hours, 161 hours, 162 hours, 163 hours, 164, hours, 165 hours, 166 hours, 167 hours, 168 hours, 169 hours, 170 hours, 171 hours, 172 hours, 173 hours, 174, hours, 175 hours, 176 hours, 177 hours, 178 hours, 179 hours, 180 hours, 181 hours, 182 hours, 183 hours, 184, hours, 185 hours, 186 hours, 187 hours, 188 hours, 189 hours, 190 hours, 191 hours, 192 hours, 193 hours, 194, hours, 195 hours, 196 hours, 197 hours, 198 hours, or 199 hours; and (b) the possible maximum treatment times of 3 hours, 4, hours, 5 hours, 6 hours, 7 hours, 8 hours, 9 hours, 10 hours, 11 hours, 12 hours, 13 hours, 14, hours, 15 hours, 16 hours, 17 hours, 18 hours, 19 hours, 20 hours, 21 hours, 22 hours, 23 hours, 24, hours, 25 hours, 26 hours, 27 hours, 28 hours, 29 hours, 30 hours, 31 hours, 32 hours, 33 hours, 34, hours, 35 hours, 36 hours, 37 hours, 38 hours, 39 hours, 40 hours, 41 hours, 42 hours, 43 hours, 44, hours, 45 hours, 46 hours, 47 hours, 48 hours, 49 hours, 50 hours, 51 hours, 52 hours, 53 hours, 54, hours, 55 hours, 56 hours, 57 hours, 58 hours, 59 hours, 60 hours, 61 hours, 62 hours, 63 hours, 64, hours, 65 hours, 66 hours, 67 hours, 68 hours, 69 hours, 70 hours, 71 hours, 72 hours, 73 hours, 74, hours, 75 hours, 76 hours, 77 hours, 78 hours, 79 hours, 80 hours, 81 hours, 82 hours, 83 hours, 84, hours, 85 hours, 86 hours, 87 hours, 88 hours, 89 hours, 90 hours, 91 hours, 92 hours, 93 hours, 94, hours, 95 hours, 96 hours, 97 hours, 98 hours, 99 hours, 100 hours, 101 hours, 102 hours, 103 hours, 104, hours, 105 hours, 106 hours, 107 hours, 108 hours, 109 hours, 110 hours, 111 hours, 112 hours, 113 hours, 114, hours, 115 hours, 116 hours, 117 hours, 118 hours, 119 hours, 120 hours, 121 hours, 122 hours, 123 hours, 124, hours, 125 hours, 126 hours, 127 hours, 128 hours, 129 hours, 130 hours, 131 hours, 132 hours, 133 hours, 134, hours, 135 hours, 136 hours, 137 hours, 138 hours, 139 hours, 140 hours, 141 hours, 142 hours, 143 hours, 144, hours, 145 hours, 146 hours, 147 hours, 148 hours, 149 hours, 150 hours, 151 hours, 152 hours, 153 hours, 154, hours, 155 hours, 156 hours, 157 hours, 158 hours, 159 hours, 160 hours, 161 hours, 162 hours, 163 hours, 164, hours, 165 hours, 166 hours, 167 hours, 168 hours, 169 hours, 170 hours, 171 hours, 172 hours, 173 hours, 174, hours, 175 hours, 176 hours, 177 hours, 178 hours, 179 hours, 180 hours, 181 hours, 182 hours, 183 hours, 184, hours, 185 hours, 186 hours, 187 hours, 188 hours, 189 hours, 190 hours, 191 hours, 192 hours, 193 hours, 194, hours, 195 hours, 196 hours, 197 hours, 198 hours, or 199 hours, or 200 hours.

Water-Facilitated Decomposition of O—BN

As shown in Example 3 below, we have discovered that O—BN decomposes (i.e., loses functionalized surface oxygen) over time after initial synthesis. Based on initial ATR and XPS data, water may be factor in the observed decomposition.

Accordingly, certain embodiments include the additional step of removing water from the resulting O—BN product and/or from the environment surrounding and/or in contact with the O—BN product. A variety of methods for removing water from a composition are known in the art.

This phenomenon further suggests that the O—BN product be stored in a substantially water-free environment and/or stored in the presence of a desiccant. A variety of desiccants that would be appropriate for such use are known in the art. Non-limiting examples include silica, activated charcoal, anhydrous calcium sulfate, anhydrous calcium chloride, and molecular sieves, such as zeolites.

The following examples are offered for illustrative purposes only, and are not intended to limit the scope of the invention in any way. Indeed, various modifications of the invention in addition to those shown and described herein will become apparent to those skilled in the art from the foregoing description and the following Examples and fall within the scope of the appended claims.

III. Examples

Example 1: A Mixed Propane/Air Feed Oxygen-functionalizes Boron Nitride

Figure 1:
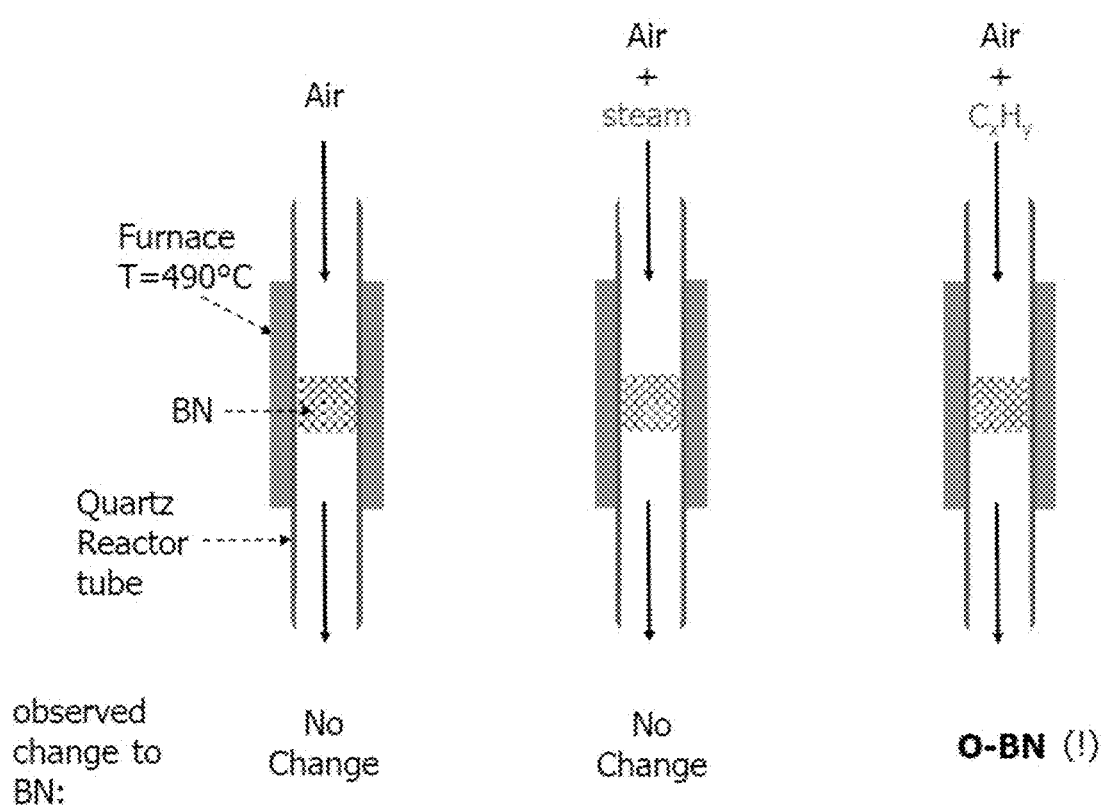
FIG. 1 is a schematic drawing generally illustrating the quartz reactor tube experiments reported in Examples 1 and 2. When a gaseous reactant stream containing air (Example 1, leftmost panel) or air plus steam (Example 1, center panel) was flowed past BN loaded into a quartz reactor tube heated to a given temperature (in Example 1, 490° C.), the BN was not functionalized with oxygen. However, when the gaseous reactant stream contained both air and a hydrocarbon ($C_xH_y$.

In this example, we demonstrate that a gaseous feed that includes both an exemplary organic compound (propane) and oxygen can be used for the O-functionalization of boron nitride. As illustrated in FIG. 1, when a gaseous feed containing both oxygen ("Air") and propane ("$C_xH_y$," where C is 3 and y is 8) is flowed over a BN surface within a quartz reactor tube, O—BN is produced (FIG. 1, right panel). In contrast, no O—BN is produced using an Air feed (containing oxygen but no organic compound; FIG. 1, left panel) or an Air+Steam feed (again, containing oxygen but no organic compound; FIG. 1, center panel). Accordingly, this Example surprisingly demonstrates that a mixed oxygen/organic compound treatment may be used to O-functionalize boron nitride. These results were confirmed using two different forms of boron nitride: hexagonal boron nitride (h-BN) and boron nitride nanotubes (BNNTs).

Experiments, Results, and Discussion.

To obtain "spent" BN from fresh BN, both fresh h-BN and fresh BNNTs were loaded into quartz tube reactors heated to 490° C. under flowing propane and oxygen, with nitrogen included in the stream as an inert carrier gas. Total inlet flow rates were about 80 mL min$^{-1}$. The total on stream time was 4 hours, after which the "spent" h-BN and BNNTs were recovered from the reactor for further analysis. Operating conditions were as follows: $P_{O2}$=0.15 atm, $P_{C3H8}$=0.3 atm, $P_{N2}$=0.55 atm, T=490° C.

For h-BN, about 300 mg of BN particles 600-710 μm in size were loaded in a 9 mm inner diameter quartz reactor and subsequently exposed to the mixed gas stream described above. For BNNTs, about 40 mg of BNNTs were diluted with about 100 mg inert $SiO_2$ particles, and the resulting composition was loaded in a 9 mm inner diameter quartz reactor and subsequently exposed to the mixed gas stream described above.

To provide evidence for oxygen functionalization of the BN surface when exposed to the mixed gaseous stream containing oxygen and propane, we used a combination of X-ray Photoelectron Spectroscopy (XPS), Attenuated Total Reflectance (ATR) Fourier Transform Infrared (FTIR), and Diffuse Reflectance Infrared Fourier Transform Spectroscopy (DRIFTS) measurements to characterize the material before ("fresh") and after ("spent") exposure to the mixed gaseous stream.

As a first step, we used XPS to monitor the surface concentrations of boron, nitrogen and oxygen for fresh h-BN and BNNT, spent h-BN and BNNT, and h-BN treated only with air. As seen in Table 1 below, in both spent h-BN and spent BNNT, there was a significant increase in surface oxygen concentration, signaling oxygen functionalization of the BN surface. A similar increase in surface oxygen content was not observed for h-BN exposed only to air at 490° C., indicating that the organic compound (propane) must be present for oxygen to functionalize the surface of the h-BN or BNNT.

As a further experiment, h-BN was exposed to an air-steam mixture at 490° C. Consistent with the conclusion that the organic compound is needed for oxygen to functionalize the BN surface, no increase in surface oxygen was observed.

TABLE 1

Elemental Composition of Fresh H-BN and BNNT, Spent h-BN and BNNT, and Air-treated h-BN, as measured by XPS (atom %)

| Sample | B (at %) | ± | N (at %) | ± | O (at %) | ± |
|---|---|---|---|---|---|---|
| Fresh hBN | 54.00 | 0.07 | 43.44 | 0.06 | 2.56 | 0.02 |
| Air-treated hBN | 54.04 | 0.09 | 43.74 | 0.09 | 2.22 | 0.04 |
| Spent hBN | 52.03 | 0.10 | 40.33 | 0.20 | 7.64 | 0.28 |
| Fresh BNNT | 53.85 | 0.05 | 42.62 | 0.28 | 3.54 | 0.23 |
| Spent BNNT | 47.41 | 0.44 | 28.11 | 0.42 | 24.48 | 0.06 |

These observations were corroborated with ATR FTIR measurements, which showed the emergence of a broad feature around 3200 $cm^{-1}$ and a sharp signal 1190 $cm^{-1}$ for spent h-BN (FIG. 2A), assigned to OH-stretching and B—O stretching vibrations, respectively (Sainsbury et al., *J. Am. Chem. Soc.*, 134, 18758-18771 (2012); Nautiyal et al., *Sci. Rep.*, 6, 29498 (2016)). These spectroscopic features were absent with fresh h-BN, as well as with h-BN treated only under air at 490° C. Using DRIFTS, we saw more-resolved features appear at 3420 and 3250 $cm^{-1}$ with spent h-BN (FIG. 2B).

BNNT show a similar behavior, only with a significant intensity in the given spectral range already present for the fresh samples and a corresponding increased intensity for the spent materials (FIGS. 3A and 3B).

In sum, this example demonstrates that BN in multiple forms becomes oxygen-functionalized upon exposure to both oxygen and propane, an exemplary organic compound.

Materials and Methods.

Hexagonal boron nitride (h-BN, Sigma-Aldrich & Alfa-Aesar) and boron nitride nanotubes (BNNT, BNNT, LLC) were used as provided without further chemical or thermal treatment. All suppliers guarantee >99% purity of h-BN and BNNT, which was confirmed with our own metal impurity analysis using induced coupled plasma optical emission spectroscopy.

Powder h-BN was compressed using a pellet press (Pike Technologies) and sieved to collect particles of 600-710 μm diameter, in order to limit any potential mass transfer effects. About 300 mg h-BN was loaded into the quartz reactor tube. For the BNNT reactor tube, about 40 mg BNNT (unpressed) was diluted with about 100 mg inert $SiO_2$ particles to ensure a uniform bed. Flowrates of propane (industrial grade, Airgas), oxygen (UHP, Airgas) and nitrogen (UHP, Airgas) were controlled using three mass flow controllers (Bronkhorst).

Infrared spectra were recorded on a Bruker Vertex 70 spectrometer equipped with a liquid nitrogen cooled MCT detector and a diffuse reflectance accessory (DiffusIR, Pike Technologies) 64 spectra were co-added with a resolution of 8 $cm^{-1}$. BN samples were diluted 1:20 in infrared-grade KBr and ground together. Then ca. 5 mg of this mixture was loaded into the accessory and heated to 490° C. at a heating rate of 10° C. $min^{-1}$ under a flow of 10 mL $min^{-1}$ of air. Introduction of gases was controlled via a manifold with various mass flow controllers (Bronkhorst).

Attenuated total reflectance (ATR) FTIR measurements were taken on a Bruker Vertex 70 equipped with a liquid nitrogen-cooled MCT detector. The ATR cell used was a MIRacle single reflection cell equipped with a diamond crystal (Pike Technologies). In a typical measurement 128 scans were averaged with a 4 $cm^{-1}$ resolution. All samples were ground without dilution and then clamped down onto the crystal by means of a manually-tightened die. Sample collection and analysis was carried out using the OPUS software package (Bruker).

Elemental surface compositions were determined by X-ray photoelectron spectroscopy using a K-alpha XPS (Thermo Scientific) instrument with a micro-focused monochromatic Al Kα x-ray source. Samples were not pretreated prior to measurements. Samples were analyzed at $10^{-7}$ mbar and room temperature. Spectra were taken in the regions of O 1s, N 1s, B 1s. For each sample, B 1s and O 1s spectra were taken over 30 scans and N 1s spectra were taken over 20 scans. The pass energy was held at 50 eV, the dwell time at 50 ms, and the energy step size at 0.2 eV for all scans in all regions. The sample was irradiated with the x-ray gun, as well as an electron flood gun, during all measurements to avoid sample charging. Each region was integrated using the Avantage (Thermo Scientific) software package to determine elemental surface composition.

Example 2: Multiple Alkanes can be Used to Facilitate Oxygen Functionalization of BN, and the Extent of O-functionalization is Influenced by Both the Identity of the Alkane and Gas Stream Exposure Time In this example, we extend the BN oxygen-functionalization method outlined in Example 1 above by using four alkanes in addition to propane as the exemplary organic compound. We followed the procedures outlined in Example 1, using h-BN loaded quartz reactor tubes exposed to an 80 mL/minute mixed gas stream at 500° C. or at 470° C. Separate experiments were performed using methane, ethane, propane, isobutane and n-butane as the alkane hydrocarbon in the mixed gas stream, at a concentration of 0.1 atm (for n-butane or isobutane) or 0.2 atm (for methane, ethane, propane, or isobutene). Each gas stream further included oxygen at a concentration of 0.1 atm, with the remainder of the mixed gas stream being nitrogen.

After three hours (for methane, ethane, propane or isobutane at 0.2 atm) or 48 hours (for n-butane and isobutane at 0.1 atm) of exposure to the mixed gas stream, the "spent" h-BN was analyzed by XPS, as described in more detail in Example 1 above. As seen in Table 2 below, each of the five alkanes tested facilitated oxygen-functionalization at the BN surface. The specific identity of the alkane appears to influence the degree of O-functionalization observed, with the extent of oxygen functionalization directly correlated with the number of carbon atoms in the alkane. The two $C_{4+}$ alkanes exhibited the highest extent of oxygen functionalization, with isobutane resulting in the highest oxygen atom %.

TABLE 2

Effect of Alkane Identity and Temperature on O-Functionalization of BN

| Mass before (mg) | Mass after (mg) | Mass change (mg) | Temp (° C.) | Treatment Time (hrs) | Alkane | $P_{alkane}$ (atm) | $P_{O2}$ (atm) | $F_{total}$ (mL/min) | B (at %) | N (at %) | O (at %) |
|---|---|---|---|---|---|---|---|---|---|---|---|
| — | — | — | — | — | — | — | — | — | 53.9 | 44.1 | 2.0 |
| 300.0 | 298.8 | −1.2 | 500 | 3 | Methane | 0.2 | 0.1 | 80 | 53.9 | 43.9 | 2.3 |
| 298.7 | 298.5 | −0.2 | 500 | 3 | Ethane | 0.2 | 0.1 | 80 | 53.9 | 43.7 | 2.4 |
| 302.2 | 303.1 | 0.9 | 500 | 3 | Propane | 0.2 | 0.1 | 80 | 53.6 | 43.5 | 3.0 |
| 299.0 | 300.3 | 1.3 | 500 | 3 | Isobutane | 0.2 | 0.1 | 80 | 53.3 | 42.9 | 3.8 |
| — | — | — | 470 | 48 | n-butane | 0.1 | 0.1 | 40 | 51.6 | 36.2 | 12.3 |
| — | — | — | 470 | 48 | Isobutane | 0.1 | 0.1 | 40 | 47.7 | 27.2 | 25.1 |

Furthermore, the Table 2 data demonstrate that treatment time is another variable that influences the extent of O-functionalization of BN, with a 48-hour treatment time resulting in a substantially increased oxygen atom % in the resulting product, as compared to a three hour treatment.

In sum, this example demonstrates that the disclosed method can be used with organic compounds other than propane, including with four additional exemplary alkanes. Furthermore, the identity of the alkane used influences the extent of oxygen-functionalization observed on the BN surface. Finally, this example demonstrates that other reaction parameters, such as time of treatment, can significantly affect the extent of observed oxygen-functionalization, suggesting that such parameters can be tuned to maximize oxygen-functionalization, or to target a desired extent of oxygen-functionalization in a final product.

Example 3: Oxygen Decomposition Over Time in O-functionalized h-BN

In this example, we demonstrate that O—BN gradually loses its O content after initial synthesis, perhaps due to contact with atmospheric moisture. This data suggests steps that could be taken to stabilize and prevent such decomposition, including removing water or moisture from the O—BN surface and/or the surrounding environment, or storing the O—BN in a water-free environment and/or in the presence of a desiccant.

We oxygen-functionalized h-BN using the previously reported silver etching method (Liao et al., *Scientific Reports*, 5, 14510, DOI:10.1038/srep14510 (2015)). We then determined the stability of the resulting O-h-BN, by measuring atom % O in the sample at various times after initial synthesis using XPS. The XPS data is plotted in FIG. 4. As seen in FIG. 4, surface oxygen content decreases substantially during the first hundred days after the O-h-BN was synthesized, indicating that the functionalized oxygen atoms are lost over time.

To determine whether the observed decomposition of O-h-BN over time could be related to the presence of atmospheric moisture, we performed ATR FTIR measurements, as described in more detail in Example 1, on both the "spent" h-BN of Example 1 and on a sample of "spent" h-BN that was subsequently treated with water. The resulting measurements are shown in FIG. 5.

As seen in FIG. 5, exposure to water attenuates both the broad —OH stretching feature around 3200 cm$^{-1}$ and the sharp B—O stretching vibration signal at 1190 cm$^{-1}$ that are seen in spent h-BN. This data supports the hypothesis that water facilitates the decomposition of O—BN over time by removing functionalized oxygen from the O—BN surface.

Thus, it would be advantageous to remove water from the environment in which O—BN is stored.

Example 4: Factorial Analysis to Determine Reaction Parameters to Optimize O-functionalization of h-BN In this example, we disclose the results of factorial experiments to determine which of six reaction parameters appear to play the most important roles in the O-functionalization of h-BN (and which reaction parameters appear to be the least important). The six tested reaction parameters were alkane type (i.e., carbon chain length), concentration (volume % or mole %) of the alkane in the gaseous reactant stream, concentration (volume % or mole %) of the oxygen in the gaseous reactant stream, flow rate of the gaseous reactant stream past the h-BN, reaction temperature, and total reaction time. In sum, O-functionalization appears to be optimized when using a comparatively longer alkane, a comparatively higher flow rate, and/or a comparatively lower reaction temperature.

For these experiments, about 200 mg fresh h-BN were systematically exposed to a gaseous reactant stream containing an alkane (methane or isobutane) and $O_2$ under 32 different reaction parameter combinations. In each case, the remainder of the reactant stream was made up of $N_2$. XPS was then performed on each sample to determine extent of oxygen-functionalization for each reaction parameter combination. Statistical factorial analysis was performed on the XPS data to determine which reaction parameters (or combinations of two reaction parameters) had the greatest effect on oxygen functionalization of h-BN, and which reaction parameters had the least effect on oxygen functionalization of h-BN.

More specifically, six different reaction parameters (factors) were initially selected for analysis, including alkane identity (Alkane), concentration of the alkane in the gaseous reaction stream (P_alkane (vol %)), concentration of the oxygen in the gaseous reactant stream (P_$O_2$ (vol %)), flow rate of the gaseous reactant stream past the h-BN (F-total (mL/min)), temperature of the reaction (Temp (° C.)), and total time of exposure to the gaseous reactant stream (TOS (hr)). For each these factors, two different levels, a comparatively "low" level (designated −1) and a comparatively "high" level (designated +1) were selected for use in the factorial analysis. The six different factors used and the designated low and high levels for each are listed in Table 3 below.

TABLE 3

List of tested factor identities, as well as the two levels
("low" and "high") chosen for each factor.

| Factor | Low (−1) | High (+1) |
|---|---|---|
| Alkane | Methane | Isobutane |
| P_alkane (vol %) | 10 | 40 |
| P_O$_2$ (vol %) | 5 | 20 |
| F_total (mL/min) | 20 | 80 |
| Temp (° C.) | 400 | 600 |
| TOS (hr) | 4 | 12 |

Each individual factor and two-way interaction between factors was evaluated using statistical analysis (ANOVA) for its effect on the extent of oxygen functionalization observed on the h-BN. A half-factorial, 2 level, 6 factor analysis was done, requiring a total of 32 trials ($2^{6-1}=32$, without repeats). The organization of the fractional factorial used is shown in Table 4 below, and a visual representation of the completed fractional factorial is shown in FIG. 6.

TABLE 4

Organization of the fractional factorial
used in the statistical analysis.

| Trial # | Alkane | P$_{alkane}$ | P$_{O2}$ | Ftotal | T | t |
|---|---|---|---|---|---|---|
| 1 | −1 | −1 | −1 | −1 | −1 | −1 |
| 2 | 1 | −1 | −1 | −1 | −1 | 1 |
| 3 | −1 | 1 | −1 | −1 | −1 | 1 |
| 4 | 1 | 1 | −1 | −1 | −1 | −1 |
| 5 | −1 | −1 | 1 | −1 | −1 | 1 |
| 6 | 1 | −1 | 1 | −1 | −1 | −1 |
| 7 | −1 | 1 | 1 | −1 | −1 | −1 |
| 8 | 1 | 1 | 1 | −1 | −1 | 1 |
| 9 | −1 | −1 | −1 | 1 | −1 | 1 |
| 10 | 1 | −1 | −1 | 1 | −1 | −1 |
| 11 | −1 | 1 | −1 | 1 | −1 | −1 |
| 12 | 1 | 1 | −1 | 1 | −1 | 1 |
| 13 | −1 | −1 | 1 | 1 | −1 | −1 |
| 14 | 1 | −1 | 1 | 1 | −1 | 1 |
| 15 | −1 | 1 | 1 | 1 | −1 | 1 |
| 16 | 1 | 1 | 1 | 1 | −1 | −1 |
| 17 | −1 | −1 | −1 | −1 | 1 | 1 |
| 18 | 1 | −1 | −1 | −1 | 1 | −1 |
| 19 | −1 | 1 | −1 | −1 | 1 | −1 |
| 20 | 1 | 1 | −1 | −1 | 1 | 1 |
| 21 | −1 | −1 | 1 | −1 | 1 | −1 |
| 22 | 1 | −1 | 1 | −1 | 1 | 1 |
| 23 | −1 | 1 | 1 | −1 | 1 | 1 |
| 24 | 1 | 1 | 1 | −1 | 1 | −1 |
| 25 | −1 | −1 | −1 | 1 | 1 | −1 |
| 26 | 1 | −1 | −1 | 1 | 1 | 1 |
| 27 | −1 | 1 | −1 | 1 | 1 | 1 |
| 28 | 1 | 1 | −1 | 1 | 1 | −1 |
| 29 | −1 | −1 | 1 | 1 | 1 | 1 |
| 30 | 1 | −1 | 1 | 1 | 1 | −1 |
| 31 | −1 | 1 | 1 | 1 | 1 | −1 |
| 32 | 1 | 1 | 1 | 1 | 1 | 1 |

The degree of oxygen functionalization of h-BN (expressed as the percentage of atoms of the hBN surface identified as oxygen) for each trial, as evaluated by X-ray Photoelectron Spectroscopy (XPS), is illustrated in FIG. 7. The nominal O-content of fresh h-BN (2.3 at %) is represented in this graph as a dotted black line. Trials are grouped with brackets, colors, stars (*), or number assignments according to the level of the factor assigned to the trial. These were the results that were input into statistical analysis to determine which factors had the greatest (and least) influence on the degree of O-functionalization of the h-BN surface.

Analysis of variance (ANOVA) of the fractional factorial, evaluating the contributions of both individual factors and two-way interactions of these factors for their influence on the O-functionalization of the h-BN surface, is shown in Table 5 below. Particular emphasis is placed on the p-value; factors and two-way interactions with low p-values have a great influence on the degree of O-functionalization of h-BN, while the opposite is true of factors and two-way interactions with high p-values. In other words: we should reject the null hypothesis of factors and two-way interactions with p-values <0.055 (null hypothesis: O-content of h-BN exposed to air/alkane treatment is equal to the O-content of fresh hBN).

The most-influential factors and two-way interactions are therefore (in order, starting with the most influential) 1) Temperature, 2) Alkane identity, 3) Alkane identity*Temperature, 4) Total flowrate, 5) Temperature*Alkane concentration. The trials which produced the greatest O-functionalization used a comparatively longer-chain alkane, comparatively lower treatment temperature, comparatively faster gas flowrate, and a comparatively higher concentration of the alkane. The least-influential (highest p-value) factors and two-way interactions are (in order, starting with the least influential) 1) Alkane concentration*Oxygen concentration, 2) Total flowrate*Treatment time, 3) Alkane concentration*Total flowrate, 4) Oxygen concentration, 5) Alkane concentration*Treatment time.

TABLE 5

Analysis of variance (ANOVA) of the fractional factorial,
evaluating the contributions of both individual factors and
two-way interactions of these factors for their influence on the
O-functionalization of the h-BN surface.

| Source | DF | Adj SS | Adj MS | F-Value | P-Value |
|---|---|---|---|---|---|
| Model | 21 | 76.4008 | 3.6381 | 2.13 | 0.109 |
| Linear | 6 | 41.4129 | 6.9021 | 4.04 | 0.026 |
| Alkane | 1 | 13.7616 | 13.7616 | 8.06 | 0.018 |
| P_alkane | 1 | 2.6479 | 2.6479 | 1.55 | 0.241 |
| P_O2 | 1 | 0.2056 | 0.2056 | 0.12 | 0.736 |
| F_total | 1 | 9.4885 | 9.4885 | 5.56 | 0.040 |
| Temperature | 1 | 14.7221 | 14.7221 | 8.62 | 0.015 |
| TOS | 1 | 0.5873 | 0.5873 | 0.34 | 0.571 |
| 2-Way Interactions | 15 | 34.9879 | 2.3325 | 1.37 | 0.314 |
| Alkane * P_alkane | 1 | 4.4290 | 4.4290 | 2.59 | 0.138 |
| Alkane * P_O2 | 1 | 1.6133 | 1.6133 | 0.94 | 0.354 |
| Alkane * F_total | 1 | 1.4900 | 1.4900 | 0.87 | 0.372 |
| Alkane * Temperature | 1 | 11.7431 | 11.7431 | 6.88 | 0.026 |
| Alkane * TOS | 1 | 0.4501 | 0.4501 | 0.26 | 0.619 |
| P_alkane * P_O2 | 1 | 0.0160 | 0.0160 | 0.01 | 0.925 |
| P_alkane * F_total | 1 | 0.0698 | 0.0698 | 0.04 | 0.844 |
| P_alkane * Temperature | 1 | 8.1659 | 8.1659 | 4.78 | 0.054 |
| P_alkane * TOS | 1 | 0.2321 | 0.2321 | 0.14 | 0.720 |
| P_O2 * F_total | 1 | 1.1533 | 1.1533 | 0.68 | 0.430 |
| P_O2 * Temperature | 1 | 1.7414 | 1.7414 | 1.02 | 0.336 |
| P_O2 * TOS | 1 | 0.5317 | 0.5317 | 0.31 | 0.589 |
| F_total * Temperature | 1 | 2.9312 | 2.9312 | 1.72 | 0.219 |
| F_total * TOS | 1 | 0.0262 | 0.0262 | 0.02 | 0.904 |
| Temperature * TOS | 1 | 0.3949 | 0.3949 | 0.23 | 0.641 |
| Error | 10 | 17.0805 | 1.7081 | | |
| Total | 31 | 93.4813 | | | |

In sum, this Example demonstrates how reaction parameters can be tuned to maximize O-functionalization of h-BN. Specifically, greater O-functionalization may be obtained using a comparatively longer chain alkane, a comparatively lower treatment temperature, and/or a comparatively higher alkane concentration.

The invention is not limited to the embodiments set forth in this disclosure for illustration, but includes everything that is within the scope of the claims. Furthermore, all documents cited in this disclosure are hereby incorporated by reference in their entirety and for all purposes as if fully set forth in this disclosure.

We claim:

1. A method of making oxygen-functionalized boron nitride (O—BN), comprising contacting boron nitride (BN) simultaneously with one or more compositions that together comprise both oxygen and one or more organic compounds, whereby the boron nitride becomes oxygen-functionalized boron nitride (O—BN).

2. The method of claim 1, wherein the one or more compositions are gaseous.

3. The method of claim 2, wherein the boron nitride is contacted with the one or more gaseous compositions by a continuous flow of the one or more gaseous compositions over the surface of the boron nitride.

4. The method of claim 2, wherein the one or more gaseous compositions further comprise nitrogen.

5. The method of claim 1, wherein the boron nitride is in the form of hexagonal boron nitride (h-BN), boron nitride nanomeshes (h-BN nanomeshes), boron nitride nanosheets (BNNSs), boron nitride nanoribbons (BNNRs) or boron nitride nanotubes (BNNTs).

6. The method of claim 1, wherein the one or more organic compounds include 3 or more carbon atoms (are $C_{3+}$ organic compounds), 4 or more carbon atoms (are $C_{4+}$ organic compounds), 5 or more carbon atoms (are $C_{5+}$ organic compounds), 6 or more carbon atoms (are $C_{6+}$ organic compounds), 7 or more carbon atoms (are $C_{7+}$ organic compounds), or 8 or more carbon atoms (are $C_{8+}$ organic compounds).

7. The method of claim 1, wherein the one or more organic compounds are selected from the group consisting of aliphatic hydrocarbons, an aromatic hydrocarbons, alcohols, ketones, aldehydes, carboxylic acids, carbonates, a boronic acids, and borinic acids.

8. The method of claim 1, wherein the one or more organic compounds have from one to ten carbon atoms.

9. The method of claim 8, wherein the one or more organic compounds have from four to ten carbon atoms.

10. The method of claim 8, wherein the organic compound is selected from the group consisting of methane, ethane, propane, isobutane, and n-butane.

11. The method of claim 1, wherein the one or more organic compounds are not propane.

12. The method of claim 1, wherein the boron nitride is contacted with the one or more compositions for a total of 2-200 hours.

13. The method of claim 1, wherein the boron nitride is contacted with the one or more compositions at a temperature of 200° C.-900° C.

14. The method of claim 13, wherein the boron nitride is contacted with the one or more compositions at a temperature of 200° C.-500° C.

15. The method of claim 13, wherein the boron nitride is contacted with the one or more compositions at a temperature of less than 500° C.

16. The method of claim 13, wherein the boron nitride is contacted with the one or more compositions at a temperature of 250° C.-850° C.

17. The method of claim 1, wherein the one or more compositions are gaseous, and wherein the one or more organic compounds in the one or more compositions have a concentration (Mol %$_{organic\ compound}$) of 0.05-0.95 Mol %.

18. The method of claim 1, wherein the one or more compositions are gaseous, and wherein the oxygen in the one or more compositions has a concentration (Mol %$_{O2}$) of 0.05-0.95 Mol %.

19. The method of claim 1, wherein the one or more compositions are gaseous, and wherein the boron nitride is contacted with the one or more gaseous compositions by a continuous flow of the one or more gaseous compositions over the surface of the boron nitride, and wherein the total flow rate of the one or more gaseous compositions over the surface of the boron nitride is 10-1000 mL/min.

20. The method of claim 19, wherein the total flow rate of the one or more gaseous compositions over the surface of the boron nitride is 60 mL/min or higher.

21. The method of claim 1, further comprising the step of removing water from the O—BN surface or from the environment adjacent to the O—BN surface.

* * * * *